Sept. 5, 1950     R. WILTEIN     2,521,109
PLANT BLOCKER
Filed Oct. 25, 1945
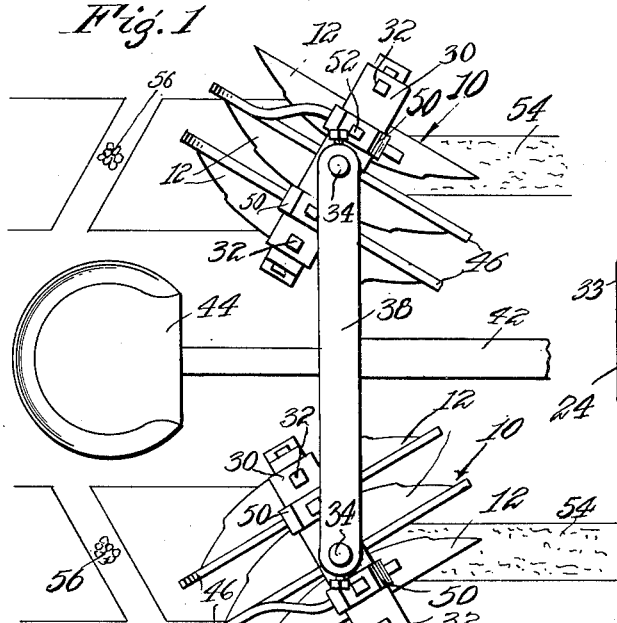
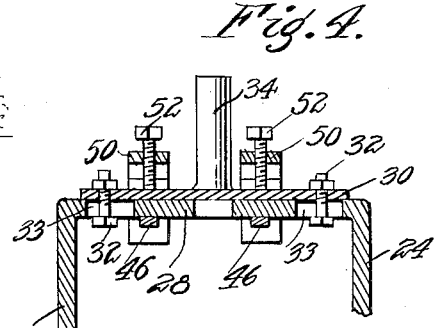
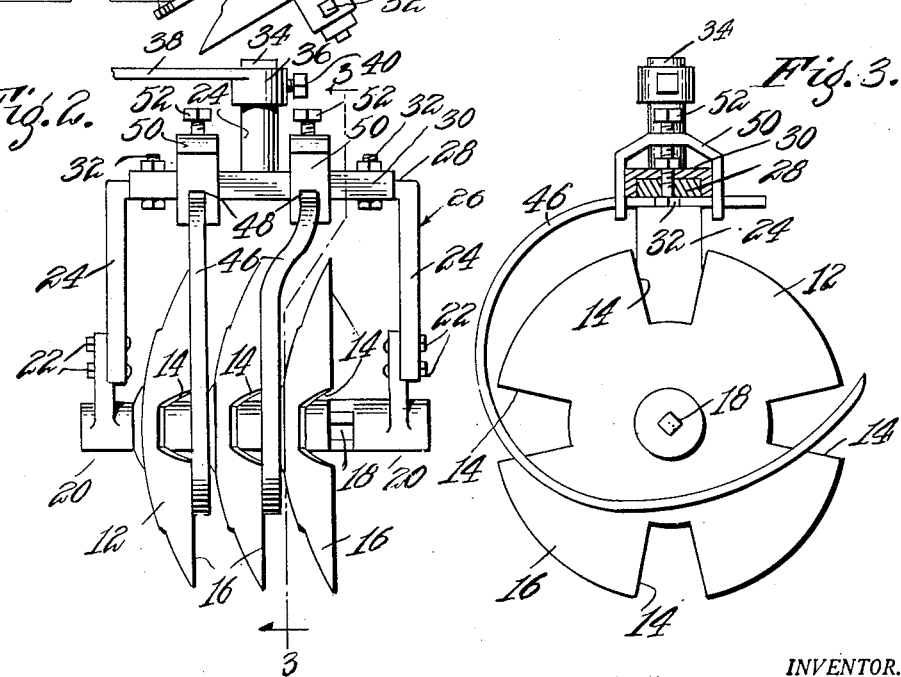
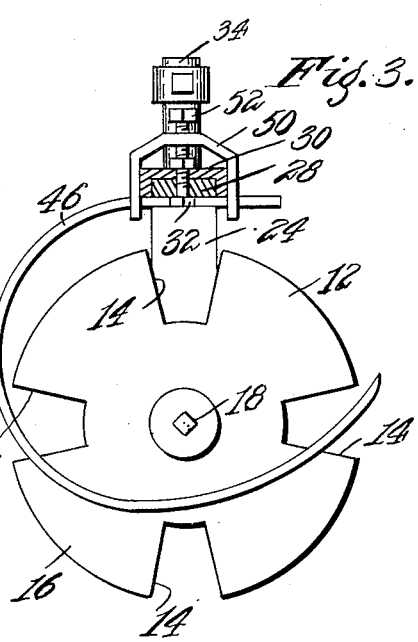
INVENTOR.
Rudolph Wiltein.
BY
Victor J. Evans & Co.
ATTORNEYS Patented Sept. 5, 1950

2,521,109

UNITED STATES PATENT OFFICE 2,521,109

PLANT BLOCKER

Rudolph Wiltein, Sterling, Colo.

Application October 25, 1945, Serial No. 624,436

1 Claim. (Cl. 97—22)

My invention relates to agricultural machines, and has among its objects and advantages the provision of an improved plant blocker.

In conventional plant blockers or choppers, it is common practice to employ two disks arranged in converging relationship. The disks are arranged with their convexed sides face to face. When cultivating, such cooperating disks do not contact at the proper depth in the soil, which results in the formation of a ridge between the disks. Plants aligned in the ridge remain uncut. Running the disks deeper to avoid this objection results in deep furrows on both sides of the plants far below the roots thereof, with the result that the plants will not survive such root exposure.

Accordingly an object of my invention is to provide a plant blocker wherein soil cultivating disks are formed and arranged in a novel manner to perform an efficient blocking function, in addition to effectively cultivating the soil simultaneously with the plant thinning operation.

In the accompanying drawings:

Figure 1 is a top view of a plant blocker in accordance with my invention.

Figure 2 is an elevational view of one gang of disks.

Figure 3 is a view taken from the position indicated by line 3—3 of Figure 2, and Figure 4 is a sectional detail view of a mount for cleaner tines.

In the embodiment of the invention selected for illustration, I make use of two disk gangs 10, these gangs being identical in construction, each preferably comprising three disks 12. The disks 12 in each gang are arranged in the same order, but the disks of one gang are reversed with respect to the disks of the other gang. Each disk is provided with four notches 14 intersecting its cutting edge 16. These notches are equally spaced circumferentially of the disks. A greater number of notches decreases the blocking interval, while fewer notches increases the interval.

Each gang of disks is fixed to a shaft 18 rotatably supported in bearings 20 bolted at 22 to the vertical bars 24 of L-shaped frame members 26. The horizontal legs 28 of the members 26 lie within a channel 30 and are bolted thereto, as at 32, these bolts extending through slots 33 in the legs 28 so that the members 28 may be adjusted to proper relative positions.

An upright shaft 34 is welded to each channel 30, which shafts are disposed in bearings 36 at the outer ends of a horizontal bar 38. Set screws 40 fixedly relate the shafts 34 to the bearings, although the shafts may be rotated in the bearings when the set screws are loosened so that the disk gangs 10 may be adjusted to various angles. A draw member 42 is fixed to the bar 38, as well as a seat 44.

Upon the channels 30 are mounted curved tines 46, which bend downwardly and upwardly between the disks 12 to prevent dirt clods, weeds and the like from accumulating between the disks. The upper ends of the tines extend through openings 48 in U-shaped clips 50 and underneath the legs 28. Set screws 52 are threaded through the bights of the clips and have end engagement with the channels 30 to clamp the tines to the legs.

In operation, all the recesses 14 in the respective disk gangs 10 are in straight lines. Movement of the implement along the plant rows 54 causes the disks to cultivate the soil and cut all the plants with the exception of those coming within the aligned recesses 14, so that the cultivated rows leave plants 56 spaced at regular intervals.

Without further elaboration, the foregoing will so fully explain my invention, that others may, by applying current knowledge, readily adapt the same for use under various conditions of service.

I claim:

A plant blocker comprising frame means, said frame means including a draw member, a bar fixed to said member at right angles thereto, U-shaped frames rotatably secured to each end of said bar two disk gangs for respectively cultivating plant rows to destroy excessive plants, each disk gang being rotatably mounted in a U-shaped frame and including a plurality of disk members having notches intersecting their cutting edges in equally spaced relation to each other, the disks in each gang being arranged in the same order but reversed with respect to the disks in the other gang, and means for adjusting the U-shaped frames supporting the two disk gangs.

RUDOLPH WILTEIN.

REFERENCES CITED

The following references are of record in the file of this patent:

UNITED STATES PATENTS

| Number | Name | Date |
|---|---|---|
| 467,400 | Denney et al. | Jan. 19, 1892 |
| 514,209 | Clark | Feb. 6, 1894 |
| 529,457 | Maul | Nov. 20, 1894 |
| 920,929 | DeWald | May 11, 1909 |
| 990,576 | Markley | Apr. 25, 1911 |
| 1,625,379 | Sweeney | Apr. 19, 1927 |
| 2,373,716 | Soucie | Apr. 17, 1945 |